United States Patent [19]

Gordon

[11] Patent Number: 4,974,549
[45] Date of Patent: Dec. 4, 1990

[54] FASTENER FOR USE WITH A THIN OR NARROW DIAMETER PET LEAD

[76] Inventor: Richard A. Gordon, 95 W. 3rd St., Freeport, N.Y. 11520

[21] Appl. No.: 325,361

[22] Filed: Mar. 17, 1989

[51] Int. Cl.⁵ ............................................. A01K 27/00
[52] U.S. Cl. ..................................... 119/109; 119/106; 24/115 K; 24/135 R; 411/429; 411/301
[58] Field of Search ............ 119/109, 106; 24/115 H, 24/115 K, 135 R, 135 A, 135 N; 411/429, 427, 301, 302, 908

[56] References Cited
U.S. PATENT DOCUMENTS
3,867,905 2/1975 Vail ..................................... 119/106

Primary Examiner—John Weiss
Attorney, Agent, or Firm—Bauer & Schaffer

[57] ABSTRACT

A plastic fastener made of first and second keeping elements which are functionally joined together by means of a self-tapping screw which passes through cooperating openings in the keeper elements and is anchored in a dome-shaped element disposed on the second keeper element. The element is employed in combination with a pet lead to form a collar when the pet lead is disposed in the keeper element.

7 Claims, 1 Drawing Sheet

U.S. Patent  Dec. 4, 1990  4,974,549
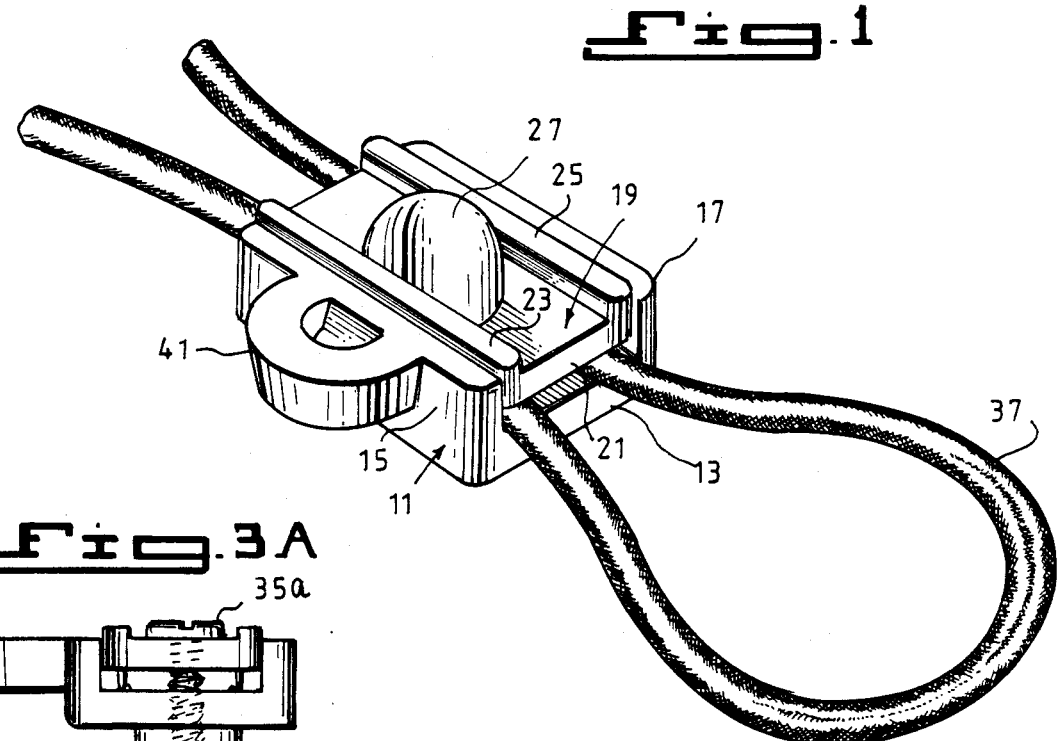
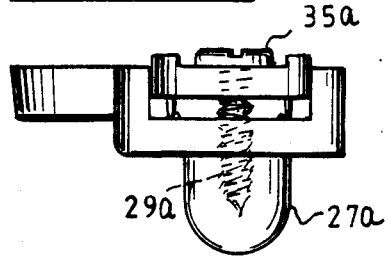
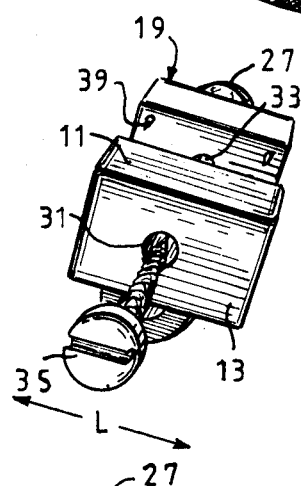
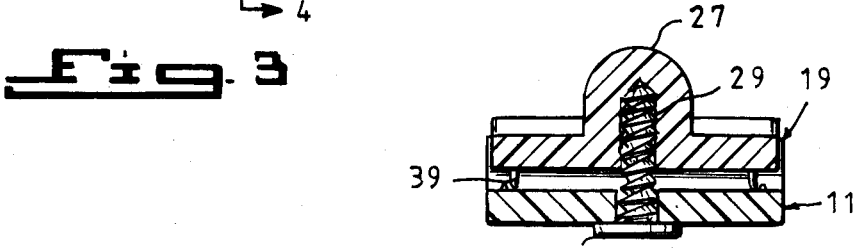

FASTENER FOR USE WITH A THIN OR NARROW DIAMETER PET LEAD

This invention relates to a fastener for use with a thin or narrow diameter pet lead. More particularly, the invention relates to a fastener such as a keeper to be used in combination with braided or woven leads suitable for use on small pet animals such as ferrets, cats, and the like.

BACKGROUND OF THE INVENTION

The lead for small animals is commonly formed from a small diameter woven or braided fabric or plastic line or "chain". It is looped about the neck of the animal and fastened by a keeper more or less fixedly in place. The known fastener comprises a saddle member having a pair of integral, opposed, upwardly extending longitudinal walls and a base which is of a size so that it fits in the saddle between the walls. Both the saddle and base are provided with a hole which when aligned permits a fully threaded screw to be is passed therethrough and to which a threaded acorn-shaped or dome-shaped nut is screwed to clamp the base and saddle to each other. The pet lead is looped between the base and saddle and is retained therein by the clamping action to form a collar for a pet.

Now, while this known fastener adequately performs when used in combination with a woven or braided pet lead, it also exhibits certain disadvantageous drawbacks. For example, the device includes the four described elements and when one disassembles the device to change the lead or modify the size of the pet lead, it is awkward to reassemble, especially with respect to placement of the threaded nut on the threaded screw. Moreover, the screw and nut are easily misplaced when assembling and disassembling the device, the nut being especially subject to becoming lost each time it is loosened.

A further disadvantage lies in the fact that the nut is a small metal part, provided with an internal screw thread, and therefor quite costly to fabricate, and expensive for the customer to replace.

There exists, therefore, a need for the provision of devices of the type described which do not present such disadvantages. The present invention fulfills such a need.

BRIEF STATEMENT OF THE INVENTION

In accordance with the present invention, there is provided a plastic fastener for use in combination with a pet lead of the type described comprising a saddle member having flat web and a pair of integrally opposed, upwardly extending walls along each longitudinal edge and a flat base member insertable between the longitudinal walls, in opposition to the web of the saddle. Both the saddle and the base are provided with cooperating holes through which a screw is insertable. At least one of the saddle or base member is provided with a dome shaped receiving element having a non-threaded bore aligned with the hole in its major section. A self-tapping screw is disposed through the holes in both the saddle and base and anchored in the bore of the dome-shaped receiving element to cause the saddle and base to clamp together whereby the pet lead can be looped between the saddle and base and be fixedly retained therebetween. The self-tapping screw is tightened to the degree necessary to hold the loop of the lead being fixed thus forming a secure pet collar in one end of the lead.

THE DRAWINGS

In order to describe the keeper of this invention more fully, reference is directed to the accompanying drawings which are to be taken in conjunction with the following description and in which drawings:

FIG. 1 is a perspective view of a plastic fastener in accordance with the invention employed in combination with a pet lead;

FIG. 2 is a bottom perspective view of a fastener according to the present invention showing the self-tapping screw for bringing the saddle and base members in position;

FIG. 3 is a front view in elevation of the fastener illustrated in FIG. 1 without a pet lead looped therein;

FIG. 3A is a view similar to that of FIG. 3, showing an embodiment wherein the dome is located on the saddle member; and FIG. 4 is a sectional view of the fastener illustrated in FIG. 3 and taken across line 4—4 of FIG. 3.

DESCRIPTION OF THE PREFERRED EMBODIMENTS

In FIG. 1, the fastener for use with a pet lead for a small animal, such as a ferret, comprises a saddle member 11 having a web 13 and a pair of integral, opposed, upwardly extending, longitudinal peripheral members 15 and 17 into which a base element 19 having a web 21 and a pair of integral, opposed, upwardly extending longitudinal edges 23 and 25, sits. The base 19 sits firmly and squarely with the walls of saddle 11 so that its web 21 lies in opposition to the web 13 of the saddle 11.

In the embodiment shown, the base element 19 is provided with an integrally formed dome shaped screw receiving element 27. The screw receiving element 27 is located approximately central of the base 19 and is further provided with a smooth inner bore 29 perpendicular to the plane of the base 19.

Moreover, both the saddle 11, and the base element 19 are provided with holes 31 and 33, (FIG. 2) in their respective webs (13 and 21) which align with each other and with the hole 29 in the domed element 27. A self-tapping screw 35 is passable through the saddle member 11 and base element 19 entering into the dome-shaped element 27, so that when rotated, it threads and embeds itself in the element 27. When a pet lead 37, having generally free ends is looped through the fastener, as shown in FIG. 1, and the screw 35 is tightened and anchored in dome-shaped element 27, the saddle 11 and base element 19 clamp together to secure the ends of the loop.

In order to insure that the loop of the lead 37 is firmly secured in the fastener, the opposed surfaces of the web 13 of the saddle member 11 and the web of the base element 19 are provided with a plurality of sharp points 39 respectively, as shown in FIG. 2. Finally, an eyelet piece 41 extends laterally from one wall 15 of the saddle member 11, providing a finger grip and hook member to which the opposed end of the lead, identification tag or other device may be clipped.

Preferably the fastener is molded of plastic material such as, for example, thermoplastic, thermosetting or pressure molded plastic as for example, nylon, molded nylon, polyethylene, polyurethane and polyvinyl chloride and the like, all of such materials being readily available in commercial channels. Fabrication of the fasteners is simplified by the reduction in the number of parts and the fact that the base element 19 and integral dome 27 can be simultaneously and integrally molded. It is also possible to form the present construction of a cast or pressed metal such as aluminum.

In FIG. 3A, the saddle 11, rather than the base 19, is provided with a dome 27. In this case the screw 35A is placed through the base 11 which is provided with a through hole. Otherwise the device is constructed and functions the same.

The fastener of this invention and the pet leads employed therewith, may be made in a wide variety of sizes and useful with a wide variety of animals from small to large animals.

The fastener of this invention provides many advantages. For example, it not only may be made from a wide variety of molded plastics, such as those mentioned above, but may be readily molded by known plastic molding techniques. In addition, the fastener has fewer parts and is less awkward to use, as compared to the known keeper described hereinabove. There is less danger of losing the parts thereof. Still further, since it utilizes fewer parts, material costs are reduced by one third to one half and, as well, lower costs for manual assembly of the inventive keeper is reduced about one third. Numerous other advantages of this invention will be apparent to those skilled in the art.

A further major advantage of the present invention lies in the fact that the dome shaped element provides an integral nut, which can not be lost, dropped or mislaid, and that should the self-tapping screw be misplaced, it can be easily replaced by another or with any type of screw.

Various modifications, changes and embodiments have been disclosed herein. Others will be obvious to those skilled in the art. Accordingly, it is to be understood that the foregoing disclosure is illustrative only and not limiting of the invention.

What is claimed is:

1. A fastener for use in combination with a pet lead, said fastener comprising a saddle member having a central web and a pair of integral, opposed, upwardly extending, peripheral wall members and a base element comprising a central web and a pair of integral, opposed, upwardly extending, peripheral members located on said base and a dome-shaped element integrally extending upward from the surface of the central web of said base between the peripheral members; both said saddle and base being provided with cooperatingly aligned openings located in the central webs thereof and in alignment with the integral dome shaped element and a self-tapping screw disposable in said cooperating openings to be anchored in said dome-shaped element, whereby one end of a pet lead can be looped between said saddle and base and retained therebetween when said screw is tightened in said dome-shaped element and said saddle and base are brought into close clamping disposition with respect to each other.

2. The plastic fastener according to claim 1 wherein the saddle and base are made of plastic.

3. The plastic fastener according to claim 1 wherein the saddle includes an integrally molded eyelet extending alternately therefrom of an external pet lead.

4. The plastic fastener according to claim 1 including a plurality of sharp points disposed on the opposed surfaces of at least one of said saddle and base.

5. A plastic fastener for use in combination with a pet lead comprising (1) a generally rectangular first keeper element provided with a rectangular base having a pair of integral, oppositely disposed, upwardly extending, peripheral side walls (2), a generally rectangular second keeper element provided with a base having a pair of integral oppositely disposed upwardly extending peripheral side walls and a solid dome-shaped element located on the base surface of said second element, said second element being sized with respect to said first element so that it fits into the area of said first element bound by the side members thereof; both said first and second elements being provided with cooperating openings located in the base member thereof; and (3) a self-tapping screw disposed in said cooperating openings and anchored in said dome-shaped element, whereby said first and second elements are joined in a cooperative relationship to retain therebetween a looped portion of a pet lead disposed between them when said screw is tightened in said solid dome-shaped element and said first and second keeper elements are brought into closer disposition with respect to each other and thus form a pet collar in one portion of said pet lead.

6. A plastic fastener according to claim 5 including a plurality of sharp points disposed on the upper surface of the base member of the first keeper element and a plurality of sharp points disposed on the lower surface of the base member of the second keeper element.

7. A plastic fastener according to claim 6 wherein in combination therewith, a pet lead looped between the first keeper element and the second keeper element.

* * * * *